(12) United States Patent
Kulla

(10) Patent No.: US 8,872,826 B2
(45) Date of Patent: Oct. 28, 2014

(54) SYSTEM AND METHOD FOR DECOUPLED RAY MARCHING FOR PRODUCTION RAY TRACKING IN INHOMOGENEOUS PARTICIPATING MEDIA

(75) Inventor: Christopher Kulla, Los Angeles, CA (US)

(73) Assignees: Sony Corporation, Tokyo (JP); Sony Pictures Technologies Inc., Culver City, CA (US)

(*) Notice: Subject to any disclaimer, the term of this patent is extended or adjusted under 35 U.S.C. 154(b) by 302 days.

(21) Appl. No.: 13/399,661

(22) Filed: Feb. 17, 2012

(65) Prior Publication Data

US 2012/0212496 A1 Aug. 23, 2012

Related U.S. Application Data

(60) Provisional application No. 61/444,038, filed on Feb. 17, 2011, provisional application No. 61/515,667, filed on Aug. 5, 2011.

(51) Int. Cl.
*G06T 15/50* (2011.01)
*G06T 15/06* (2011.01)
(52) U.S. Cl.
CPC ........... *G06T 15/506* (2013.01); *G06T 15/06* (2013.01)
USPC .......................................................... 345/426
(58) Field of Classification Search
USPC .......................................................... 345/426
See application file for complete search history.

(56) References Cited

U.S. PATENT DOCUMENTS

| | | | |
|---|---|---|---|
| 7,233,332 B2 * | 6/2007 | Lokovic et al. | 345/426 |
| 2009/0006044 A1 | 1/2009 | Zhou et al. | |
| 2010/0085360 A1 | 4/2010 | Ren et al. | |
| 2011/0012901 A1 | 1/2011 | Kaplanyan | |

OTHER PUBLICATIONS

Yue et al., Unbiased, Adaptive Stochastic Sampling for Rendering Inhomogeneous Participating Media, ACM Transactions on Graphics, vol. 29, No. 6, Article 177, Dec. 2010, pp. 177:1-177:7.*
Microsoft Corporation, "Real-Time Smoke Rendering using Compensated Ray Marching," Aug. 2008, http://dl.acm.org/citation.cfm?id=1360635&dl=ACM&coll=DL.
Ken Perlin et al., Hypertexture, Computer Graphics, vol. 23, No. 3, Jul. 1989, pp. 253-261.

* cited by examiner

*Primary Examiner* — Richard M Russell
(74) *Attorney, Agent, or Firm* — Mark D. Wieczorek; Mayer & Williams PC

(57) ABSTRACT

Provided are systems and methods to perform ray marching for production ray tracing in inhomogeneous participating media. The systems and methods allow a reduction of the quadratic complexity without giving up the benefits of accurate ray traced lighting. In one implementation, the task of ray marching is reformulated into a task of transforming an unknown, spatially varying volume into a collection of piecewise homogeneous segments. Being homogeneous, inexpensive analytical formulas may be employed for evaluating and sampling the transmission term at arbitrary points in the segments.

14 Claims, 5 Drawing Sheets ial Patent Application Ser. No. 61/515,667, filed Aug. 5,
SYSTEM AND METHOD FOR DECOUPLED RAY MARCHING FOR PRODUCTION RAY TRACKING IN INHOMOGENEOUS PARTICIPATING MEDIA

CROSS-REFERENCE TO RELATED APPLICATIONS

This application claims benefit of priority of U.S. Provisional Patent Application Ser. No. 61/515,667, filed Aug. 5, 2011, entitled "Decoupled Ray Marching Of Heterogeneous Participating Media" and U.S. Provisional Patent Application Ser. No. 61/444,038, filed Feb. 17, 2011, entitled "Decoupled Ray Marching for Production Ray Tracing Of Inhomogeneous Participating Media", both of which are owned by the assignee of the present invention and incorporated by reference herein in their entirety.

BACKGROUND

Rendering inhomogeneous volume densities is a challenging problem. A primary difficulty comes from the inability to analytically importance sample the transmission term:

$$\tau(t) = e^{-\int_0^t (\sigma_s(x) + \sigma_a(x))dx} \quad (1)$$

Where $\tau(t)$ is the transmission term, t is the distance along the ray, $\sigma_s$ is the scattering coefficient, and $\sigma_a$ is the absorption coefficient. That is, heterogeneous media add the complication of a nested integral in the computation of the transmission term, and this integral is dependent on the sample position along the line.

Brute force techniques may be employed to calculate the transmission term. For example, the classical ray marching algorithm has a long history of use in production rendering due to its simplicity. Such is illustrated in prior art FIG. 1. In the system 10 of FIG. 1, a light source 14, shown as a point light source, illuminates an inhomogeneous volume 16 and the scene is incident on a pixel, point, or other such viewpoint 24, representing a point on a camera or the viewer's eye, through a plurality of rays 20 (only one of which is shown for clarity). In this way, once all rays on the camera are combined and the scene is rendered, a viewer receives an image of the inhomogeneous volume 16.

The volume equation is solved by "marching down the ray" in fixed or adaptive steps, evaluating the lighting at each sample point 18. Unfortunately, for each lighting call, shadow rays must themselves be ray marched, shown in FIG. 1 by points 22. The volume is sampled and lighting computed at each of these points as well, leading to a quadratic number $n^2$ of evaluations. In other words, just a single camera ray requires many samples as each additional step adds on the order of n samples. Such evaluations are generally performed by the shader, which is a computer program employed to calculate rendering effects, usually through a graphical processing unit.

Solutions to this problem generally fall into categories of "unbiased" and "biased".

For example, the classical Woodcock tracking algorithm from nuclear physics is an unbiased solution to this problem. However, it is a rejection sampling algorithm, and as such its performance is highly dependent on the sparsity of the density field. In addition, the algorithm requires computing an upper bound on the extinction coefficient $\sigma_t$, which may be difficult for procedural or out-of-core representations, which are common in production rendering. While improvements on this algorithm have been made, they do not solve the above issues. Moreover, such improvements generally increase memory usage and require the construction of data structures that do not directly support motion blur. In addition, appropriate probability density functions for such situations are generally not directly evaluable.

In certain biased solutions to this problem, light caching techniques such as deep shadow maps have been employed. Unfortunately these techniques require multiple passes, and are prone to many sources of artifacts. In addition, treatment of multiple scattering requires still further approximations.

Stochastic ray marching, as illustrated by histogram 30 in FIG. 1, has also been attempted, where volumes are sampled along rays until such a point as $e^{-\tau(t)} < \epsilon$. Lighting is then computed for each step. Such methods are similar to unbiased algorithms, but are still biased due to the fixed size of the steps. In such techniques the sample distribution is only implicit, and the probability density function is not directly evaluable.

Hence, there remains a need for a rendering technique for inhomogeneous participating media which can compute lighting through such media without the disadvantages noted above.

SUMMARY

Systems and methods according to the principles described here provide a way to reduce the quadratic complexity of rendering lighting in inhomogeneous participating media without giving up the benefits of accurate ray-traced lighting. Such inhomogeneous participating media include that imaging smoke, clouds, fire, and the like. In certain implementations, the evaluation of ray marching is decoupled from the evaluation of lighting, and the probability density function along the ray can be evaluated and inverted efficiently.

It is initially noted that for homogeneous media, unbiased solutions are efficient and practical, as $e^{-\int \sigma_t(x)dt} \to e^{-\sigma_t t}$, where $\sigma_t$ is the extinction or attenuation coefficient. In this way, Equation (1) simplifies to:

$$\tau(t) = e^{-t(\sigma_s + \sigma_a)} \quad (2)$$

Equation (2) can be evaluated and sampled analytically, leading to simple Monte Carlo solutions. In addition, such benefits remain even if the homogeneous media is confined to a finite region of space, e.g., leading to $e-\sigma_t^{(b-a)}$ for a region of space between a and b. Only the normalization constants change on the associated probability density function.

In light of the above, in one implementation of the systems and methods described here, the task of ray marching is reformulated into a task of transforming an unknown and spatially varying inhomogeneous volume into a sequence of piecewise homogeneous segments. In this way, more convenient analytical formulas may be employed to evaluate and sample Equation (1) at arbitrary points.

In one implementation, a first step is to march down the ray in fixed or adaptive steps, forming a series of segments. A random sample point within the segment of each step is chosen and a volume shader is run on the point. The volume properties $\sigma_s$ and $\sigma_a$ are determined and stored, e.g., are recorded into an array, from which a probability density function may be constructed. In one implementation, the probability density function is piecewise linear or piecewise constant and proportional to $\sigma_s(t)\tau(t)$. The light sampling loop can then draw samples along the ray using this probability density function. In this way, the light sampling loop is outside of or decoupled from the ray marching loop, i.e., the $\tau(t)$ estimate is decoupled from the number of lighting samples. In addition, lighting samples are focused on areas where $\sigma_s(t) > 0$. For each light sample, shadow rays are traced to the light sources. In this way, the transmission term of Equation (1) is evaluated in a convenient manner. In addition, as the lighting calculations are decoupled, indirect lighting may also be evaluated recursively at a reduced computational cost.

In the above implementation, it is noted that the method only requires on the order of (N+LN) evaluations, L being the number of light samples, which is a substantial reduction when L<<N. Generally, production renderers use L=1, as many primary rays require tracing for smooth anti-aliasing and motion blur, and so the method only requires on the order of N evaluations.

Due to the piecewise segmentation, the method introduces some bias. In particular, bias may be introduced because the method assumes that within a single step, the signal does not change. However, the bias can be explicitly controlled by the step size parameter and can be made arbitrarily small. As the step size approaches the Nyquist rate of the volume, the method converges on a ground truth result. In one implementation, the shader controls how many ray marching samples are required within the bounds it occupies along the ray. In this way, by taking the step length into account, the shader can pre-filter the signal to make the above assumption more likely to hold. In this fashion, and as indicated below, the same allows for volumes of different frequency contents to be mixed in the same scene.

Where the system and method are applied to homogeneous volumes, the same may be handled without bias as a single ray marching sample captures the volume properties exactly.

In one aspect, the invention is directed to, in a production ray tracer, a biased method of performing ray marching for rendering of a volume of inhomogeneous participating media. Steps of the method include: defining a virtual ray extending from a point or pixel on a virtual viewing plane; dividing the virtual ray into a plurality of segments, each segment associated with at least a local volume of inhomogeneous participating media; for each segment, sampling a local value of $\sigma_s$ and $\sigma_a$ associated with the respective local volume; from the sampled values of $\sigma_s$ and $\sigma_a$, developing a probability density function proportional to a transmission term multiplied by a local scattering coefficient; sampling a point within each segment along the virtual ray using the developed probability density function; for each sampled point, tracing shadow rays to a light source and calculating a contribution to the point or pixel on the virtual viewing plane using the traced rays; and coloring the point according to the contribution.

Implementations of the invention may include one or more of the following. The sampling a value of $\sigma_s$ and $\sigma_a$ may be performed by a shader. The probability density function may be proportional to a product $\sigma_s(t)\tau(t)$ of the local coefficient of scattering $\sigma_s$ and the transmission term $\tau(t)$, and where $\tau(t) = e^{\wedge}(-\tau(\sigma_s+\sigma_a))$. The sampling of $\sigma_s$ and $\sigma_a$ may be performed at one or more random points within each segment. The number of calculations may be on the order of (N+LN) per ray, where N is the number of segments and L is the number of light sources, and, e.g., L may be 1. The size of the segment may be uniform. The method he further include filtering the sample points based on the size of the segment. The segments may contain participating media of different frequencies. The probability density function may be piecewise constant. The method may further include drawing sample points based on a probability density function selected from the group consisting of: a density method, an equi-angular method, or a method based on an intensity of the light source. The sampling a point may further include sampling points with more than one sampling method, and combining the results from the more than one sampling method using multiple importance sampling. The method may further include collecting or combining all of the points on the viewing plane to result in a rendered final image. The segments may be fixed in size or adaptive.

In another aspect, the invention is directed towards a non-transitory computer-readable medium, comprising instructions for causing a computing device to perform the above method.

In yet another aspect, the invention is directed towards, in a production ray tracer, an unbiased method of performing ray marching for rendering of a volume in homogeneous participating media, including steps of: defining a virtual ray extending from a point or pixel on a virtual viewing plane; dividing the virtual ray into a plurality of segments, each segment associated with at least a local volume of homogeneous participating media; for at least one segment, sampling a value of $\sigma_s$ and $\sigma_a$; from the sampled value of $\sigma_s$ and $\sigma_a$, developing a probability density function proportional to a transmission term multiplied by a local scattering coefficient; sampling one point along the virtual ray using the developed probability density function; for the sampled point, tracing shadow rays to a light source and calculating a contribution to a point on the virtual viewing plane using the traced rays; and coloring the point according to the contribution.

In another aspect, the invention is directed towards a non-transitory computer-readable medium, comprising instructions for causing a computing device to perform the above method.

In a further aspect, the invention is directed towards a rendering module, implemented on a non-transitory computer readable medium, for rendering scenes including inhomogeneous participating media illuminated by a light source, including: a defining and division module, implemented on a non-transitory computer readable medium, for defining a virtual ray and dividing the virtual ray into a plurality of segments; a coefficient determination module, implemented on a non-transitory computer readable medium, for determining local values of scattering and absorption coefficients in an inhomogeneous medium, the virtual ray passing through the inhomogeneous media; a probability density function module for determining a probability density function from the determined values of scattering and absorption coefficients; a sampling module, implemented on a non-transitory computer readable medium, for sampling at least one sampling point for each respective segment along the virtual ray; a point contribution module, implemented on a non-transitory computer readable medium, for calculating the contribution of a light source at the at least one sampling point to a portion of an image of the inhomogeneous participating media on a point on a viewing plane, the calculated contribution resulting in a color to be applied at the point on the viewing plane by a shader; and a shading module for associating the color with the point on the viewing plane.

Advantages of the systems and methods according to the principles described here may include one or more of the following, according to implementation. The systems and methods may be integrated into existing production ray tracers to provide for treatment of lighting effects in inhomogeneous participating media. The systems and methods provide for computing accurate ray traced lighting without incurring a quadratic number of shader evaluations. As the determined probability density function is proportional to $\sigma_s(t)\tau(t)$ instead of $\tau(t)$, samples are not wasted on regions that do not scatter light. In contrast to unbiased integration schemes that use rejection sampling to invert Equation (1) above, systems and methods according to the principles described do not require any knowledge of upper bounds on volume properties, the same being essential to deal with procedural and out-of-core volume representations. Indirect lighting may be evaluated recursively at a reduced computational cost. The system and method may be employed with arbitrary shaders, including procedural or time-varying ones. The system and method may be employed with any type of light source. Problems associated with light caching, preprocessing, and large auxiliary data structures are avoided. The system and method become unbiased when the participating medium is homogeneous. The system and method may be employed in situations with multiple scattering. The system and method may be employed in situations with various types of inhomogeneous media, including ones having combinations of primarily attenuating media and primarily scattering media.

BRIEF DESCRIPTION OF THE DRAWINGS

FIG. 5 is a schematic depiction of a computing environment which may be employed to run the systems and methods described here, including a rendering system, shaders, ray tracers, sampling routines, and the like.

Like reference numerals refer to like elements throughout.

DETAILED DESCRIPTION

Figure 1:
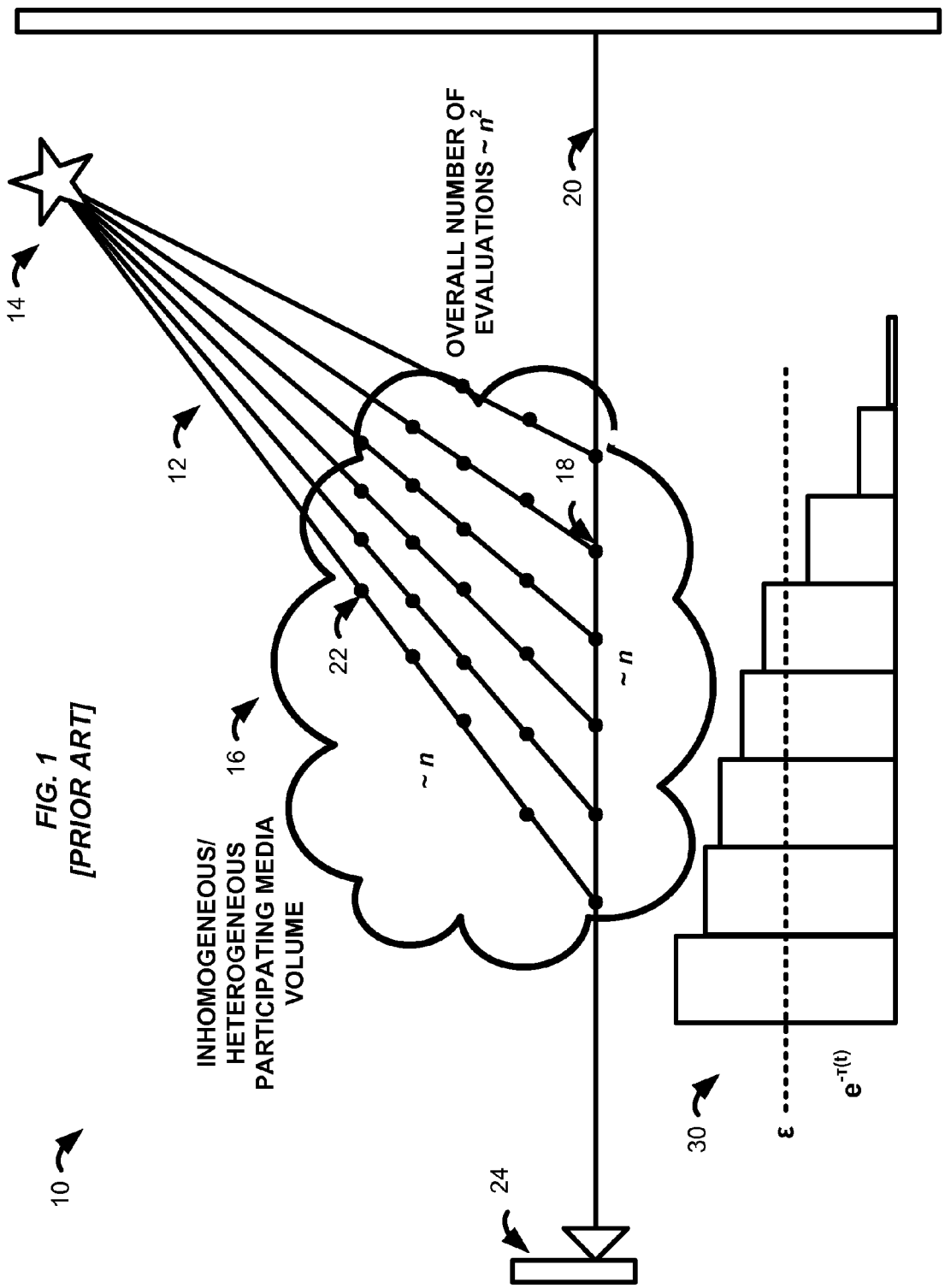
FIG. 1 illustrates schematically a prior art rendering situation for inhomogeneous participating media, as well as prior art ways of addressing such.
Figure 2:
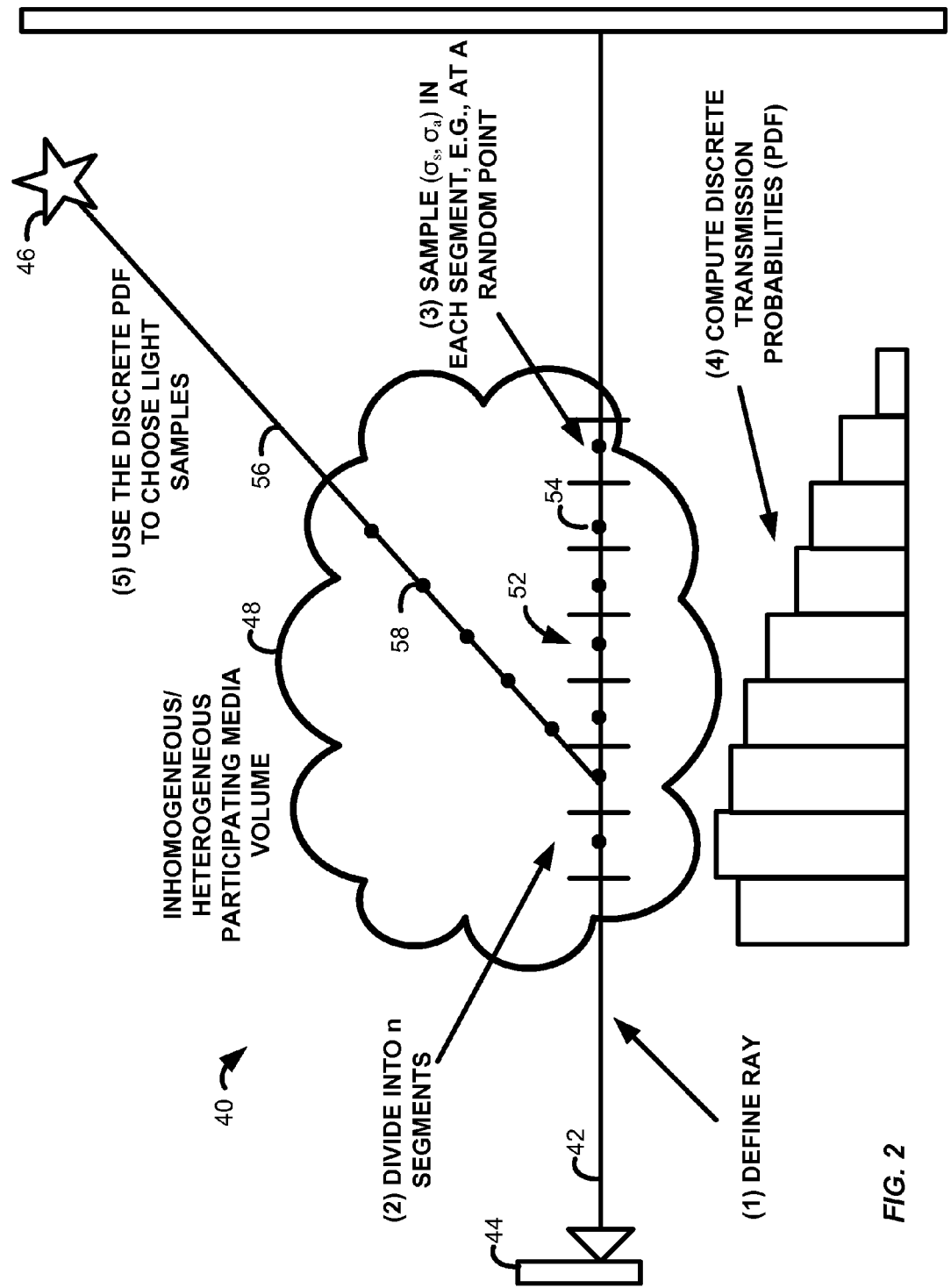
FIG. 2 illustrates schematically a layout employed in a technique to provide rendering for inhomogeneous participating media according to principles described here.
Figure 3:
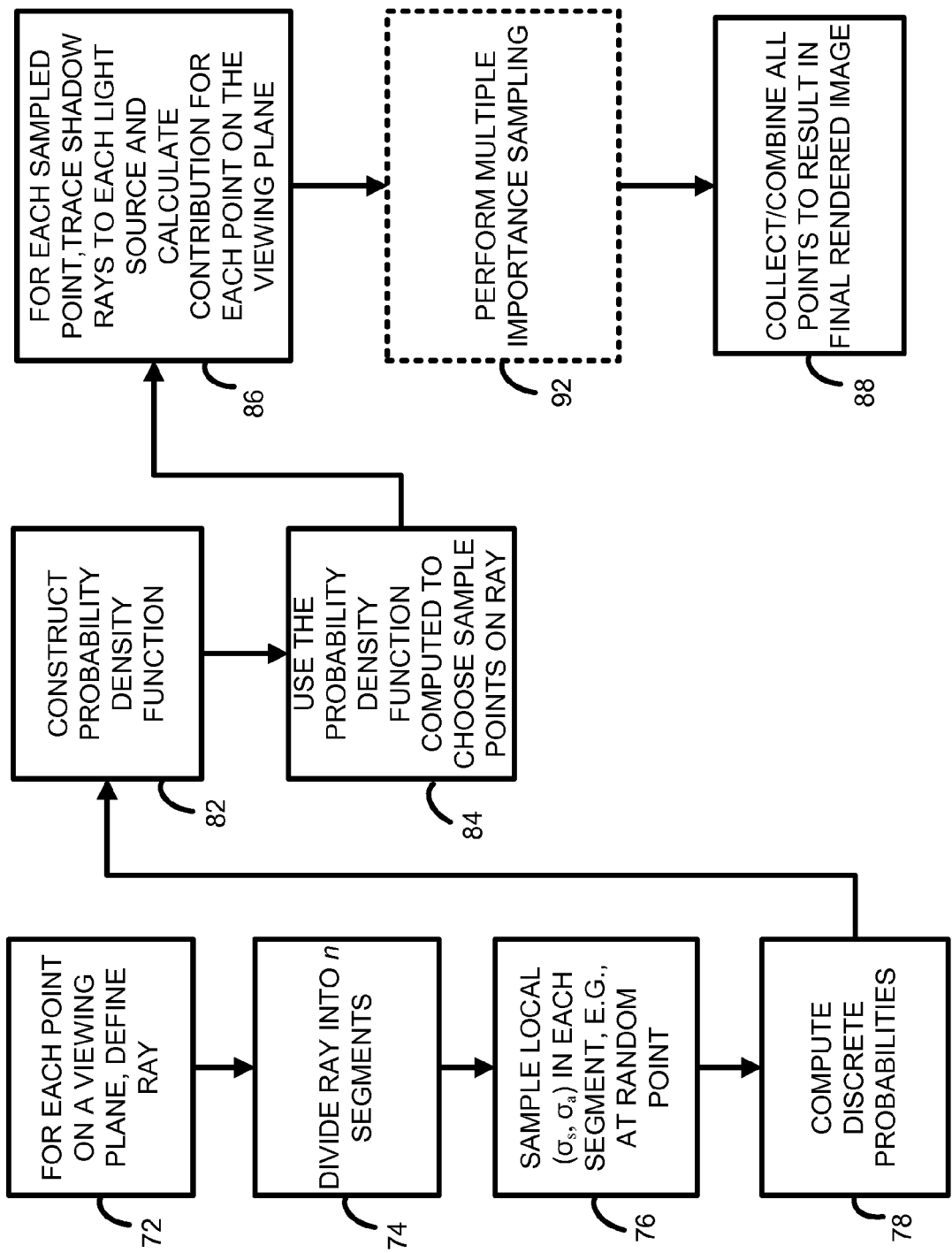
FIG. 3 is a flowchart of a method to provide rendering for inhomogeneous participating media according to principles described here.

Referring to FIGS. 2 and 3, a system and method according to the principles disclosed here is illustrated. FIG. 2 illustrates an exemplary rendering situation 40, while FIG. 3 illustrates a flowchart 50.

In a first step, a virtual ray 42 is defined impinging on a point or a pixel on a plane of view 44, the plane of view representative of, e.g., a camera or a user's eye (step 72). In a typical situation, many such rays are defined, as dictated by the resolution of the desired image. The combination or collection of all of these rays results in a final rendered of the scene. In FIG. 2, the virtual ray 42 passes through the inhomogeneous or heterogeneous participating media volume 48.

The virtual ray 42 is divided into n segments 52 (step 74), and the size of the segments 52 may be fixed or adaptive, i.e., may adapt to parameters of the participating media volume 48, or on another basis, as dictated by the requirements of the scene. Each segment may then be considered to correspond to a local volume of the participating media. For example, adaptive sizes may be employed when segmentation is based on density, or the like.

In some cases, segmentation may be such that sampling points are divided in an equi-angular fashion. By equi-angular is meant that, given the light source and given the ray, the points are distributed such that a triangle formed by the light source and two adjacent points along the ray will have an angle subtended by the triangle, at the apex coincident with the light source, which will be the same for any such triangle formed by any two adjacent sampling points along the ray. Additional details about such are provided in co-pending U.S. patent application Ser. No. 13/399,584, filed on even date herewith, entitled "SYSTEM AND METHOD FOR IMPORTANCE SAMPLING OF AREA LIGHTS IN PARTICIPATING MEDIA", owned by the assignee of the present application and incorporated by reference herein in its entirety. Alternatively, the same may be employed in a subsequent step as an alternative probability density function.

In one implementation, the segment size may be chosen or set by the shader, in which case it may also control how many ray marching samples are required within the bounds the volume occupies along the ray. In this way, volumes of different frequency contents may be mixed in the same scene.

At each segment, a random sample point 54 is chosen and $\sigma_s$ and $\sigma_a$ are determined, e.g., by having the volume shader operate at the sample point (step 76). In this way, volume properties $\sigma_s$ and $\sigma_a$ are determined for at least the local volume. These volume properties may be, e.g., recorded into an array. For nonvarying $\sigma_s$ and $\sigma_a$, the volume is homogeneous.

Using the determined volume properties, discrete probabilities at each sample 54 may be computed (step 78). In particular, the discrete probability at a segment i is given by:

$$P_i = \sigma_{s_i} \prod_{j=0}^{i-1} e^{-\sigma_{t_j} \Delta_j}$$

From the same, a discrete probability density function for transmission may be constructed (step 82), e.g., a piecewise linear or piecewise constant probability density function proportional to $\sigma_s(t)\tau(t)$.

The discrete probability density function may then be employed to choose light samples along the ray 42 (step 84). At the chosen samples, ray marching may be employed along traced rays 56 at sampling points 58. At any given point along the ray 42, as the transmission is known, i.e., can be easily calculated, for all the segments between the plane 44 and the given point, the overall contribution to the image can be determined (step 86). In this regard it is noted that points between the camera and the participating media volume generally contribute nothing to the image. The points for each virtual ray may then be collected or combined to result in a final rendered image (step 88).

Prior to the combination, during the sampling, various steps may be performed in addition, including a step of performing multiple importance sampling (step 92). For example, some points may be sampled based on light intensity and others on density, with an appropriate weighting for each type of sampling. Such additional steps generally result in a further improved image.

While an approximation is made for inhomogeneous media because of the finite segment size, the approximation retains values for the volume properties $\sigma_s$ and $\sigma_a$. Therefore, these values may be considered in light computations, including variations in these values. In one specific example, for light scattering through smoke, black smoke may absorb light while gray smoke reflects light. Both types of participating media may be present in a scene, and because systems and methods according to the principles described here take account of such, the differing effects of each type of smoke are present in the rendered scene. In certain implementations of calculations described here, however, only scattered light may be taken account of in lighting computations, and not absorbed light. In this way, lighting computations are focused on elements which contribute significantly to light present on the camera. In other words, the initial ray impinging on the camera may be analyzed through the entirety (along the ray) of the volume of participating media; but in the decoupled lighting computation, only the portions in which $\sigma_s$ is non-zero, i.e., the portion which scatters light, may be allowed to contribute in the sense of having lighting samples proposed for the calculation. In either case, such has not been shown in prior systems and methods, which generally propose samples for lighting calculations even in areas which do not scatter light.

In a specific example of the above, in particularly wispy smoke, a large number of segments may be initially divided and considered as part of the calculation. However, a significant number of those may have scattering coefficients of zero, i.e., where there is no smoke. Thus the overall calculation may be performed rapidly even in this complicated situation.

Figure 4:
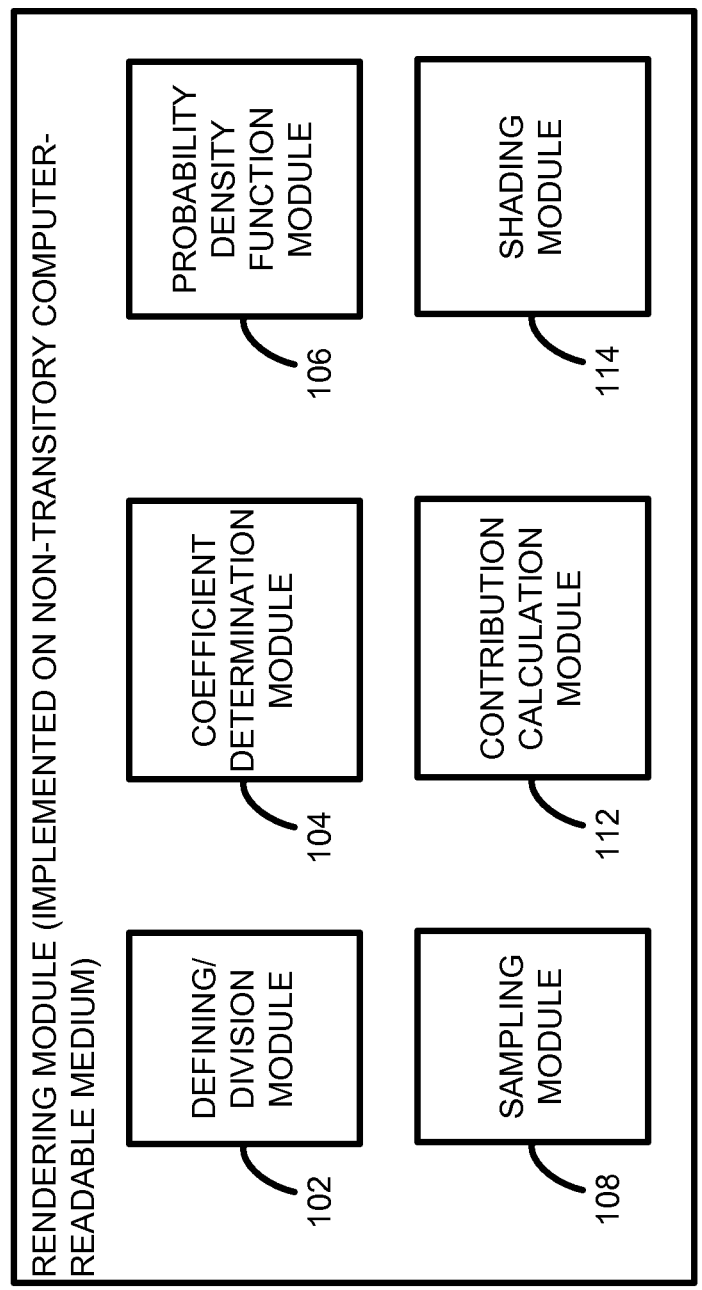
FIG. 4 illustrates a schematic depiction of a rendering module, which may be employed according to principles disclosed here.

FIG. 4 illustrates a rendering module 60, the same being generally implemented on a non-transitory computer readable medium. The same may form part of a shader, or may be a standalone module employed for rendering. The rendering module 60 includes a defining and division module 102, which is employed for the defining virtual rays and dividing the same into segments, e.g., using the methods described above. The rendering module 60 further includes a coefficient determination module 104, which samples the segments to determine local values for coefficients of scattering and absorption. The rendering module 60 further includes a probability density function module 106 which creates a discrete probability density function using the sampled coefficients, the same being generally stored in an array following their determination. The rendering module 60 further includes a sampling module 108, the same being employed for sampling points on the virtual ray with respect to the light source using the probability density function determined above. A next module is the contribution calculation module 112, which calculates the contributions from the sampled points to result in a value, used by a shading module 114 to shade the point or pixel on the viewing plane. When contributions are calculated and combined or collected from all the points for pixels pixels, a final rendered image results.

Systems and methods according to the principles disclosed here allow a significant reduction in computation time and complexity. For example, instead of taking on the order of $n^2$ calculations, only on the order of N+LN is needed, where L is the number of light samples, which is a substantial reduction when L<<N. In fact in many cases L=1. To see this it is assumed that on the order of n steps are taken for ray marching. The cumulative density function may be obtained from the probability density function also on the order of n. Samples may be drawn in a time on the order of log n using a binary search on the cumulative data function. The probability density function and transmission term $\tau$ may be evaluated for any t in a time on the order of log n, again using a binary search on the segments. Summing the above, it can be seen that only on the order of N+LN calculations are required.

Moreover, using the systems and methods disclosed here, multiple importance sampling may be employed to even further improve rendered images. In particular, combinations of line sampling strategies, e.g., density sampling, equi-angular sampling, sampling based on light intensity, or the like. Prior systems did not employ such combinations of line sampling strategies.

One implementation includes one or more programmable processors and corresponding computing system components to store and execute computer instructions, such as to execute the code that provides the various functionality, e.g., rendering, ray tracing, ray marching, sampling, and the like.

Figure 5:
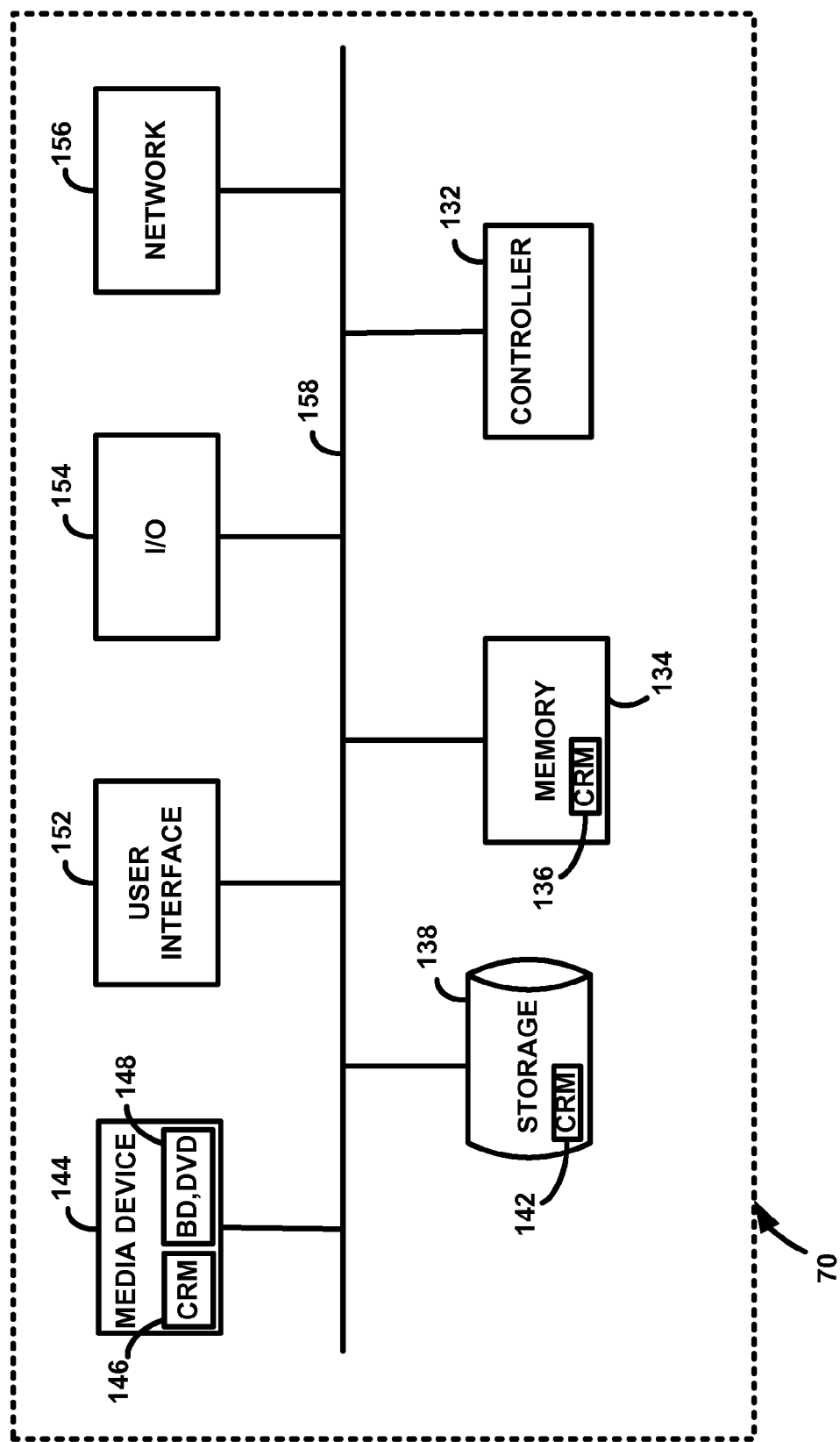

Referring to FIG. 5, a representation of an exemplary computing environment 70 is illustrated.

The computing environment includes a controller 132, a memory 134, storage 138, a media device 144, a user interface 152, an input/output (I/O) interface 154, and a network interface 156. The components are interconnected by a common bus 158. Alternatively, different connection configurations can be used, such as a star pattern with the controller at the center.

The controller 132 includes a programmable processor and controls the operation of the computing environment and its components. The controller 132 loads instructions from the memory 134 or an embedded controller memory (not shown) and executes these instructions to control the system.

Memory 134, which may include non-transitory computer-readable memory 136, stores data temporarily for use by the other components of the system. In one implementation, the memory 134 is implemented as DRAM. In other implementations, the memory 134 also includes long-term or permanent memory, such as flash memory and/or ROM.

With regard to this memory, it is noted that memory management in such systems and methods for decoupled ray marching require only temporary arrays of memory, and such grow only with the recursion depth. In many cases it is only necessary to store information about the samples along the initial ray. Generally it has been found in practice that only a few kilobytes are required. After calculations are done for one ray, the data may be discarded and the next ray analyzed. Thus, the system and method may use a per-thread memory pool with a stack interface to recycle the memory usage. The pool state is pushed before array is processed, and the state is popped when the ray volume shading is done.

Storage 138, which may include non-transitory computer-readable memory 142, stores data temporarily or long-term for use by other components of the computing environment, such as for storing data used by the system. In one implementation, the storage 138 is a hard disc drive or a solid state drive.

The media device 144, which may include non-transitory computer-readable memory 146, receives removable media and reads and/or writes data to the inserted media. In one implementation, the media device 144 is an optical disc drive or disc burner, e.g., a writable Blu-ray® disc drive 148.

The user interface 152 includes components for accepting user input, e.g., the user indications of volumes of participating media, light sources, and camera locations, and renders the resulting visual effects. In one implementation, the user interface 152 includes a keyboard, a mouse, audio speakers, and a display. The controller 132 uses input from the user to adjust the operation of the computing environment.

The I/O interface 154 includes one or more I/O ports to connect to corresponding I/O devices, such as external storage or supplemental devices, e.g., a printer or a PDA. In one implementation, the ports of the I/O interface 154 include ports such as: USB ports, PCMCIA ports, serial ports, and/or parallel ports. In another implementation, the I/O interface 154 includes a wireless interface for wireless communication with external devices. These I/O interfaces may be employed to connect to one or more content playback devices.

The network interface 156 allows connections with the local network and includes a wired and/or wireless network connection, such as an RJ-45 or Ethernet connection or WiFi interface (802.11). Numerous other types of network connections will be understood to be possible, including WiMax, 3G or 4G, 802.15 protocols, 802.16 protocols, satellite, Bluetooth®, or the like.

The computing environment may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Systems and methods according to the principles described here have provided a way for decoupled ray marching for production ray tracing of inhomogeneous participating media. In this way, lighting computations within inhomogeneous participating media may be performed without incurring a quadratic number of shader evaluations. It is noted that the specific embodiments and implementations described above are merely exemplary ways of performing the invention, and that variations will also be apparent to one of ordinary skill in the art given the teachings herein, including the figures.

For example, it is noted that the ability to distribute samples proportionally to $\sigma_s(t)\tau(t)$ allows efficient importance sampling along the ray. But this probability density function is not necessarily ideal for all situations. Other sources of variance, such as bright point lights nested inside the volume, can cause significant spikes in the lighting integral. Since the disclosed method allows the evaluation of Equation (1) at arbitrary locations, multiple importance sampling may be employed to combine other sampling strategies and resolve such issues. In such cases, appropriate weighting may be chosen for the different sampling techniques.

In other variations, e.g., for multiple scattering, the calculations described above may be performed and repeated in a recursive manner for each subsequent bounce of the ray without making further approximations. In this regard it is noted that prior techniques, such as the caching techniques described above, attempted to perform multiple scatterings but the same required significant modifications in order to represent the light after such multiple scatterings.

In other variations, the step size may be automated using ray differentials. Even more, numerous ways of calculating or estimating step size may be used: step size may vary if more or less detail was needed along the line. The system may be employed to calculate illumination from within volumes in an efficient manner, e.g., where fire is a light source. The system and method may accommodate out-of-core data sets. The system and method may employ the inhomogeneity of the volume to determine the size, distribution, and/or number of segments. In other variations, instead of employing coefficients of scattering and absorption, mathematically equivalent quantities such as extinction and albedo may be used.

Accordingly, the present invention is not limited to only those implementations described above.

The invention claimed is:

1. A biased method of performing ray marching for rendering of a volume of inhomogeneous participating media, comprising:

a. defining a virtual ray extending from a point or pixel on a virtual viewing plane;
b. dividing the virtual ray into a plurality of segments, each segment associated with at least a local volume of inhomogeneous participating media;
c. for each segment, sampling a local value of $\sigma_s$ and $\sigma_a$ associated with the respective local volume;
d. from the sampled values of $\sigma_s$ and $\sigma_a$, developing a probability density function proportional to a transmission term multiplied by a local scattering coefficient;
e. sampling a point within each segment along the virtual ray using the developed probability density function;
f. for each sampled point, tracing shadow rays to a light source and calculating a contribution to the point or pixel on the virtual viewing plane using the traced rays; and
g. coloring the point or pixel on the virtual viewing plane according to the contribution.

2. The method of claim 1, wherein the sampling a value of $\sigma_s$ and $\sigma_a$ is performed by a shader.

3. The method of claim 2, wherein a size of a segment is uniform.

4. The method of claim 3, further comprising filtering the sample points based on the size of the segment.

5. The method of claim 3, wherein the segments contain participating media of different frequencies.

6. The method of claim 1, wherein the probability density function is proportional to a product $\sigma_s(t)\tau(t)$ of the local coefficient of scattering $\sigma_s$ and the transmission term $\tau(t)$, and where $\tau(t)=e^{-t(\sigma_s+\sigma_a)}$.

7. The method of claim 6, wherein the probability density function is piecewise constant.

8. The method of claim 1, wherein the sampling of $\sigma_s$ and $\sigma_a$ is performed at one or more random points within each segment.

9. The method of claim 1, further comprising drawing sample points based on a probability density function selected from the group consisting of: a density method, an equi-angular method, or a method based on an intensity of the light source.

10. The method of claim 9, wherein the sampling a point further comprises sampling points with more than one sampling method, and combining the results from the more than one sampling method using multiple importance sampling.

11. The method of claim 1, further comprising collecting or combining all of the points on the viewing plane to result in a rendered final image.

12. The method of claim 1, wherein the segments are fixed in size.

13. The method of claim 1, wherein the segment size is adaptive.

14. A non-transitory computer-readable medium, comprising instructions for causing a computing device to perform the method of claim 1.

* * * * *